March 23, 1954  J. A. SMYSER  2,672,651
TIRE BEAD ALIGNER
Filed March 20, 1950
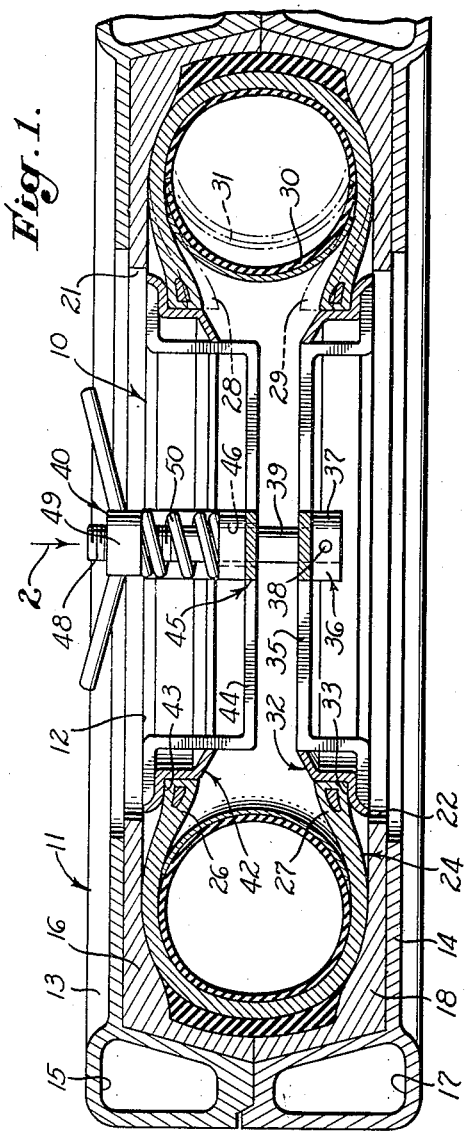
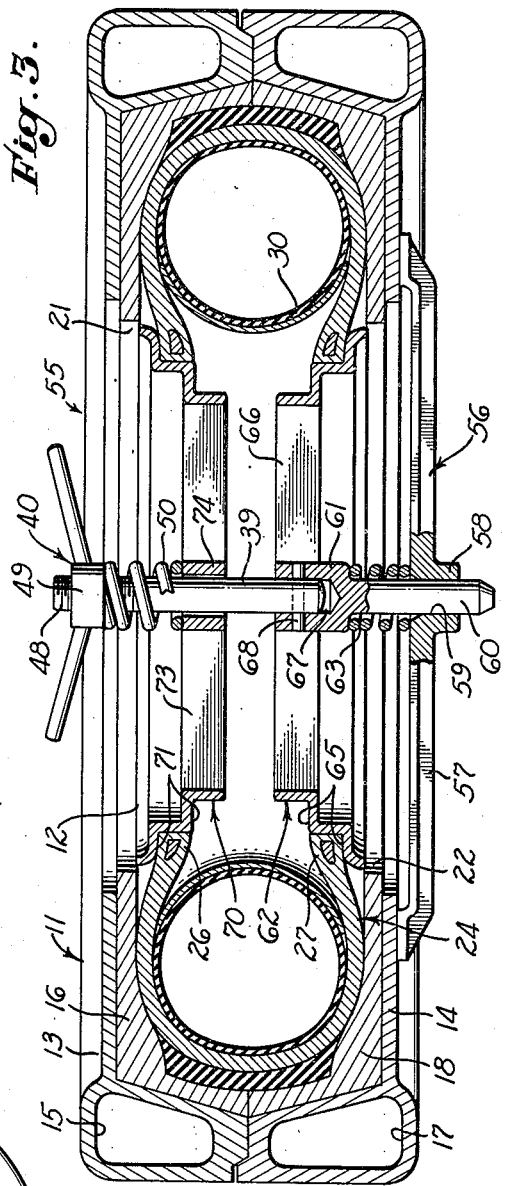
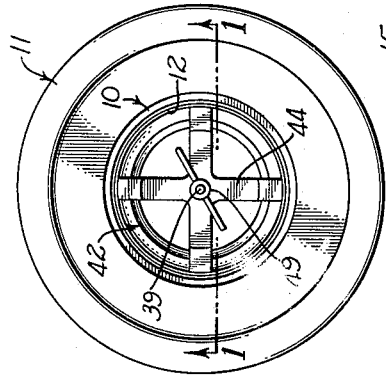
INVENTOR.
JAMES A. SMYSER
BY HIS ATTORNEYS.
HARRIS, KIECH, FOSTER & HARRIS
BY Patented Mar. 23, 1954

2,672,651

UNITED STATES PATENT OFFICE 2,672,651

TIRE BEAD ALIGNER

James A. Smyser, Kern, Calif., assignor to Super Mold Corporation of California, Lodi, Calif., a corporation Application March 20, 1950, Serial No. 150,777

13 Claims. (Cl. 18—18)

This invention relates to improvements in the tire recapping or retreading art and, more particularly, to a tire bead aligner adapted to be utilized in conjunction with a full circle mold to prevent the mislocation of the tire when pressure is applied to the tire within the mold.

When tires are recapped or retreaded in a full circle mold, the problem of the proper alignment of the tread with the tire becomes a matter of considerable importance since, if the tread is not properly aligned upon the carcass of the tire, the tread must be buffed and shaped subsequently to the vulcanizing process and, frequently, the tire must be discarded because the tread is too eccentric to permit it to be so buffed and shaped. This problem has become more acute with the advent on the market of the new low pressure tires, whose side walls are so light that, when the tire is placed in the mold and subjected to pressure sufficient to force it into contact with the matrices of the mold, it tends to twist about its circumference and cause the tread to be affixed thereto in an eccentric manner.

It is, therefore, a primary object of my invention to provide a bead aligner adapted to be utilized in conjunction with a full circle mold and to restrain the tire being recapped or retreaded by supporting the beads of said tire against lateral dislocation one with the other to insure that the tread will be perfectly centered upon the tire during the vulcanizing process.

I have discovered that, when the tire is first placed in the mold with the collapsed air bag disposed in the interior thereof, the beads of the tire assume positions in which they are closer together than when the air bag is expanded and the sidewalls of the tire driven into engagement with the walls of the matrices to cause the expansion of the beads of the tire away from each other in a vertical direction.

It is an additional object of my invention to provide a bead aligner adapted to support the beads of the tire around the entire circumference thereof at all times during the vulcanizing process and designed to automatically accommodate the vertical movement of the beads of the tire as they are vertically separated due to the subjection of the tire to pressure within the matrices of the tire mold.

A further object of my invention is the provision of a bead aligner of the aforementioned type which includes a plurality of bead supporting rims which, when they are disposed in operative relationship with the beads of a tire, are vertically spaced one above the other and are maintained in operative relationship with each other by means of a connector which permits the rims to be vertically moved with respect to each other during the application of pressure to the tire.

A further object of my invention is the provision of a bead aligner of the aforementioned type which is demountable in nature and which can be utilized to set up the tire in the matrix of the mold and which can, subsequently to the application of pressure to the tire within the matrix, be removed therefrom and utilized to properly position another tire in another mold.

A further object of my invention is the provision of a bead aligner of the aforementioned type of a tire being recapped in a predetermined relationship with each other which includes a plurality of vertically spaced rims supported upon a common connector means which includes spring means adapted to resist the vertical movement of said rims in respect to one another.

Another object of my invention is the provision of a bead aligner of the aforementioned type in which the rims are provided with a plurality of bead receiving surfaces so that the bead aligner can be utilized in conjunction with tires and molds of different sizes.

Another object of my invention is the provision of a bead aligner which includes carriage means secured to the mold with which the aligner is used, said aligner constituting, to all intents and purposes, a portion of the tire mold apparatus.

An additional object of my invention is the provision of a bead aligner including carriage means secured to the mold to support the bead aligning rims of the aligner upon the mold in which said carriage means includes shaft means upon which said rims are positioned and said shaft means is vertically reciprocable to permit the vertical movement of said rims with reference to one another.

A further object of my invention is the provision of a bead aligner of the aforementioned type in which the carriage means prevents the aligner from being shifted laterally when pressure is applied to a tire with which it is used.

Other objects and advantages of my invention will be apparent from the following specification and the accompanying drawing which is for the purpose of illustration only, and in which:

Fig. 1 is a transverse, partly sectional view taken on the broken line 1—1 of Fig. 2;

Fig. 2 is a top plan view taken in the direction of the arrow 2 of Fig. 1; and

Fig. 3 is a transverse, partly sectional view of an alternative embodiment of my invention.

Referring to the drawing, and particularly to Figs. 1 and 2 thereof, I show a bead aligner 10 constructed in accordance with my invention and adapted to be utilized in conjunction with a full circle mold 11 of the clamshell type, said mold being of substantially annular configuration and defining a central aperture 12. The mold 11 includes upper and lower halves 13 and 14, the upper half 13 including a steam chamber 15 and a matrix 16 while the lower half includes a steam chamber 17 and a matrix 18.

Skirts 21 and 22 of the matrices 16 and 18 respectively define the central aperture 12 in the mold 11. When a tire 24 is placed in the mold and is positioned in the matrices 16 and 18 of the mold 11, the beads 26 and 27 assume the dotted line positions shown at 28 and 29, or positions in which the beads are similarly disposed in relatively close contiguity and in proper alignment with each other. This is due to the fact that an air bag 30, which is customarily used to force the tire into engagement with the matrices 16 and 18, has not been expanded and is in a substantially collapsed condition as shown by the dotted line 31. It will be noted that the beads 26 and 27 of the tire 24 project, at all times, beyond the skirts 21 and 22 and are ordinarily free to move in any direction within the aperture 12 in the center of the mold 11.

When the air bag 30 is expanded by introducing air thereinto, the walls of the tire 24 are driven into engagement with the matrices 16 and 18 of the mold 11. However, as is well known to those skilled in the art, the expansion of the bag 30 and the consequent urging of the carcass of the tire into engagement with the matrices frequently result in the distortion of the tire about its circumference so that the body of the tire is shifted within the mold and the tread misaligned with respect thereto. When such torsional shifting of the tire within the mold occurs it is always accompanied by a mislocation of the beads of the tire with respect to one another. That is, the amount of mislocation of the beads with respect to one another is proportional to the amount of mislocation of the tire within the mold. When the vertical edges of the beads are in contact with an imaginary vertical line, it can be presumed that the tire is properly located within the mold 11. Such mislocation within the mold has been particularly marked with the new light walled, low pressure tires which tend to twist excessively about their circumferences within the mold when the air bag 30 is expanded to force them into contact with the matrices of the mold. In addition, since the low pressure tires are so light in construction, a more marked change occurs in the position of the beads of the tires before and after the inflation of the air bag and the resultant subjection of the body of the tire to pressure.

The bead aligner 10 of my invention is designed to cope with the aforementioned problems by supporting the beads 26 and 27 of the tire at all times and at all points upon the circumferences thereof and by accommodating the vertical movements of the beads as induced by the expansion of the air bag within the tire, as heretofore explained. The bead aligner 10 includes a first, lower bead engaging rim 32 which is provided with a bead supporting flange 33 adapted to engage and support the bead 27 of the tire 24. The bead engaging rim 32 is substantially annular in configuration and is provided with a plurality of spokes 35 which intersect at a hub 36 which has integrally formed therewith a collar 37.

Secured in the collar 37, as by means of a pin 38 or similar fastener, is the lower end of a rod 39 which constitutes a portion of a connector means 40 of the aligner. Positioned upon the rod 39 of the connector means 40 is a second, upper bead engaging rim 42 which includes a flange portion 43 adapted to engage the bead 26 of the tire 24. The rim 42 is provided with a plurality of spokes 44 which intersect in a hub 45 upon which is mounted a sleeve 46 through which passes the upper portion of the rod 39.

Formed upon the upper end of the rod 39 is a thread 48 which is adapted to be engaged by the thread, not shown, of a wing nut 49. Interposed between the wing nut 49 and the top of the collar 46 is a spring 50, the upper end of the spring being seated on the under side of the wing nut 49 and its lower end being seated on the top of the collar 46. The bead aligner 10 may be installed and used as follows: After the tire 24 is placed in the mold and the air bag 30 has been disposed inside the tire, the lower rim 32 is installed in contact with the bead 27. The sleeve 46 of the upper rim 42 is then fitted over the upper end of the rod 39 and the flange 43 of the rim is brought into engagement with the bead 26. The spring 50 is then installed about the periphery of the rod 39 at the upper end thereof with its lower end seated upon the sleeve 46 and the wing nut is threadedly engaged with the thread 48 upon the upper end of the rod 39. The wing nut 49 is then taken up until the rims 32 and 42 are in intimate engagement with the beads 26 and 27 about the entire circumferences thereof. The air bag 30 is then inflated and the beads 26 and 27 are spread apart to assume the position shown in full lines in Fig. 1 of the drawing. To accommodate this movement, the lower and upper rims 32 and 42 are permitted, because of the construction of the connector means 40, to move vertically away from each other while still supporting the beads 26 and 27 in accurate alignment with each other. This is a very important feature of my invention since it is necessary to accommodate the movement of the beads to prevent undue strain from being placed upon the body of the tire when it is subjected to pressure by the inflation of the air bag 30.

After the tire 24 has been properly aligned in the matrices 16 and 18 of the mold 11, the wing nut 49 can be unscrewed and the upper rim 42 and lower rim 32 removed from the central aperture 12 in the mold to permit the bead aligner 10 to be utilized to align another tire in another mold while the tread is being vulcanized on the tire 24.

Another embodiment of my invention is shown in Fig. 3 of the drawing wherein those portions of the embodiment identical with portions of the previously discussed embodiment are designated by identical numerals. A bead aligner 55 is attached to the lower half 14 of the mold 11 by carriage means indicated generally at 56, said carriage means including a bar like support 57 which spans the central aperture 12 diametrally thereof in the mold 11 and which is fastened to the under side of the lower half 14 of the mold by welding or similar means. Formed integrally with the support 57 intermediate the ends thereof is a boss 58 which provides a bore 59 in which is slidably positioned the lower end of a shaft 60, the upper end of said shaft constituting the hub portion 61 of a lower rim 62, for a purpose which will be described in greater detail below. Encompassing the shaft 60 and having its upper and lower ends seated respectively on the under side of the hub 61 and the upper side of the support member 57 adjacent the bore 59 is a relatively light spring 63 upon which the lower rim 62 is adapted to rest when the bead aligner 55 is not in use. The lower rim 62 includes a plurality of bead supporting surfaces 65 of different diameters so that the rim 62 may be utilized in conjunction with tires of different sizes. The rim 62 is attached to the hub 61 by means of radial spokes 66, said hub providing a seat 67 in which is received the lower end of the rod 39, said rod being retained in said seat by means of a pin 68. Positioned above, and vertically spaced from, the lower rim 62 when in use is an upper rim 70 which provides a plurality of bead receiving surfaces 71 of different diameters adapted, as in the case of the lower rim, to permit the use of the bead aligner 55 with tires of different sizes. A plurality of radial spokes 73 extends from the rim 70 to a hub formed by a sleeve 74 which is fitted around the upper portion of the rod 39. As in the case of the bead aligner 40, a wing nut 49 adjustable upon the upper end of the rod 39 controls the tension of a spring 50 enclosed between the sleeve 74 and the under side of the wing nut 49 and retains the lower and upper rims 62 and 70 in operative relationship with each other.

When it is desired to install a tire in the mold 11 of Fig. 3, the wing nut 49 is unscrewed and the spring 50 and the upper rim 70 removed from their positions on the rod 39. The tire 24 is then disposed in the lower half 14 of the mold 11 with its bead 27 in contact with one of the surfaces 65 of the lower rim 62. The upper half 13 of the mold 11 is then closed upon the tire 24 and the upper rim 70 of the aligner 55 installed upon the rod 39. The spring 50 is then positioned upon the rod 39 and the wing nut 49 engaged upon the thread 48 at the upper end of the rod 39 to cause the lower and upper rims 62 and 70 to be seated firmly upon the beads 27 and 26 of the tire 24.

The air bag 30 is then inflated to urge the tire into proper engagement with the matrices 16 and 18 of the upper and lower halves 13 and 14 of the mold 11. As the bag 30 is expanded the beads 26 and 27 are moved away from each other in a vertical direction and the lower and upper rims 62 and 70 are moved correspondingly by the vertical movement of the beads, serving at all times to so retain the beads against mislocation that the edges of the beads are maintained in contact with substantially the same imaginary vertical line drawn along said edges. As the vertical movement of the rims 62 and 70 occurs, the upper rim 70 moves upwardly on the shaft 39 and the lower rim 62 moves downwardly to cause the shaft 60 to descend in the bore 59. During this operation, the shaft 60 serves the desirable function of supporting the entire bead aligner assembly against lateral deflection and maintaining it substantially in the center of the central aperture 12 in the mold 11, thus eliminating any possibility that a lateral shift in the bead aligner 55 will impair its bead aligning function.

I thus provide by one embodiment of my invention a bead aligner adapted to be utilized in conjunction with a full circle mold o fthe clamshell type which is adapted to support the beads of the tire around the entire circumferences thereof and which incorporates means adapted to accommodate the movement of the beads as pressure is applied to the tire within the mold. In addition, a bead aligner constructed in accordance with the first embodiment of my invention is portable and demountable in nature and can be utilized to align a plurality of tires in a plurality of molds in sequence since, when one tire has been properly aligned in one mold, the bead aligner may be removed therefrom and assist in the alignment of another tire in another mold.

The other embodiment of my invention, in addition to performing in the above-described manner, includes carriage means which support it upon the mold and which assists in centering it during the expansion of the tire within the mold, thus eliminating the possibility that the expansion of the tire might cause the lateral shifting of the rims of the aligner as a whole.

Although I have shown and described preferred embodiments of my invention for the purpose of illustrating the construction and mode of operation thereof, it is obvious that changes, alterations and modifications may be made in specific details of construction and I, therefore, do not desire to be limited to such details but prefer, rather, to be afforded the full scope of the following claims.

I claim as my invention:

1. In a device adapted to prevent the torsional shifting of a tire during the application of pressure to said tire in an annular mold, the combination of: a first bead support for engaging one bead of said tire; a second bead support positioned above said first bead support for engaging the other bead of said tire; the supports being axially movable relative to each other and to the mold when the latter is in operation, and connector means attached to said first and second bead supports for maintaining them in operative relationship with each other, said connector means including spring means adapted to resist separation of said supports relative to each other as the application of pressure to said tire causes vertical movement of said beads.

2. In a device adapted to prevent the torsional shifting of a tire during the application of pressure to said tire in an annular mold, the combination of: a lower, annular bead supporting rim for engaging one bead of said tire about the entire circumference thereof; an upper, annular bead supporting rim for engaging the other bead of said tire about the entire circumference thereof spaced vertically from said lower rim and positioned substantially concentric therewith; a seat supported centrally of said lower rim; a hub supported centrally of said upper rim; a connector having its lower end secured to said seat, the said hub being slidably mounted on the connector, means movable along the upper end of the connector and engageable with the upper side of the hub and operative to move the upper rim along the connector toward the lower rim, said last named means being releasable from engagement with the hub to allow the upper rim to move away from the lower rim.

3. In a device adapted to prevent the torsional shifting of a tire during the application of pressure to said tire in an annular mold, the combination of: a lower, annular bead supporting rim for engaging one bead of said tire about the entire circumference thereof; an upper, annular bead supporting rim for engaging the other bead of said tire about the entire circumference thereof spaced vertically from said lower rim and positioned substantially concentric therewith; a seat supported centrally of said lower rim; a hub supported centrally of said upper rim; and a connector having its lower end fastened in said seat and its upper end projecting through said hub to connect said rims in operative relationship with each other and to permit the vertical movement of said rims with reference to each other when said beads are vertically moved by the application of pressure to said tire, said connector including a spring biased against said upper rim to resist said vertical movement of said rims.

4. In a device adapted to prevent the torsional shifting of a tire during the application of pressure to said tire in an annular clamshell mold, the combination of: a lower, annular bead supporting rim for engaging one bead of said tire supported for vertical movement on the lower half of said mold; an upper annular rim for engaging the other bead of said tire positioned concentrically with said lower rim; and a connector secured to said lower rim having said upper rim slidable thereupon for vertical movement with reference to said lower rim while the mold is in operation, said connector including a spring biased against said upper rim said connector further including a member carried by the lower rim and extending through said spring, and a nut on said member against which the upper end of said spring seats, for resisting said movement of said upper rim.

5. In a device for the purpose described, the combination with an annular mold which includes upper and lower halves, of a carriage means mounted upon the lower half of said mold; a lower bead engaging rim supported for vertical movement on said carriage means; a connector secured to said lower rim and projecting upwardly therefrom; a spring mounted upon the upper portion of said connector; and an upper bead engaging rim slidably mounted upon the upper portion of said connector for vertical movement in reference to said lower rim while the mold is in operation, said spring having one end seated on said upper bead engaging rim to resist said vertical movement of said rim said connector further including a member carried by the lower rim and extending through said spring, and a nut on said member against which the upper end of said spring seats.

6. In a device for the purpose described, the combination with an annular mold which includes upper and lower halves, of a carriage means mounted upon the lower half of said mold, said carriage means including a supporting member and a vertically reciprocable shaft mounted thereupon; a lower bead engaging rim supported for vertical movement with said shaft; a connector secured to said lower rim and projecting upwardly therefrom; and an upper bead engaging rim slidably mounted upon the upper portion of said connector for vertical movement in reference to said lower rim.

7. In a device for the purpose described, the combination with an annular mold which includes upper and lower halves, of a carriage means mounted upon the lower half of said mold, said carriage means including a supporting member and a vertically reciprocable shaft mounted thereupon; a lower bead engaging rim supported for vertical movement with said shaft; a connector secured to said lower rim and projecting upwardly therefrom; a spring mounted upon the upper portion of said connector; and an upper bead engaging rim slidably mounted upon the upper portion of said connector for vertical movement in reference to said lower rim said connector further including a member carried by the lower rim and extending through said spring, and a nut on said member against which the upper end of said spring seats, said spring having one end seated on said upper bead engaging rim to resist said vertical movement of said rim.

8. In a device of the character described, the combination of a mold for applying a tread to the carcass of a tire; carriage means secured to said mold; and a bead aligner including upper and lower rims, guide means fixedly supported on one of said rims in guiding relation to the other, and spring means on said guide means urging said rims toward each other.

9. In a device of the character described, the combination of: a mold for applying a tread to the carcass of a tire; carriage means secured to said mold, said carriage means including vertically reciprocable shaft means; and a bead aligner positioned on said shaft of said carriage means, said bead aligner including an upper rim and a lower rim integral with said shaft means, said rims being secured in operative relationship with each other by a connector permitting vertical movement of said rims in reference to each other while the mold is in operation.

10. In a device of the character described, the combination of: a mold for applying a tread to the carcass of a tire; carriage means secured to said mold, said carriage means including vertically reciprocable shaft means and spring means encompassing said shaft means; and a bead aligner positioned on said shaft of said carriage means and subjected to the bias of said spring means, said bead aligner including an upper rim and a lower rim integral with said shaft means, said rims being secured in operative relationship with each other by a connector permitting vertical movement of said rims in reference to each other while the mold is in operation.

11. In a full-circle horizontal tire mold which defines a central opening into which the beads of a tire confined in the mold project; a supporting bar secured on the bottom of the mold and extending diametrically across said opening, a vertical shaft unit slidable in the bar axially of the mold, a lower bead engaging rim having a hub fixed on the shaft unit above and clear of the bar, and an upper bead engaging rim having a hub slidable on the shaft unit.

12. A structure as in claim 11, with a compression spring on the shaft unit extending between the bar and the adjacent hub.

13. A structure as in claim 11, with an adjustable nut on the shaft unit above the upper rim and its hub, and a compression spring on the shaft unit extending between said nut and said upper hub.

JAMES A. SMYSER.

References Cited in the file of this patent
UNITED STATES PATENTS

| Number | Name | Date |
| --- | --- | --- |
| 1,643,493 | Gregg | Sept. 27, 1927 |
| 2,475,579 | Napier | July 5, 1949 |
| 2,371,238 | Heintz | Mar. 13, 1945 |
| 2,513,482 | Heintz | July 4, 1950 |
| 2,534,845 | Woods | Dec. 19, 1950 |